United States Patent [19]
Webster

[11] Patent Number: 5,584,792
[45] Date of Patent: Dec. 17, 1996

[54] METHOD OF STABILIZING INDUSTRIAL WASTES AND FLY ASH COMPOSITIONS USEFUL IN SAME

[76] Inventor: William C. Webster, 119 Laurel Dr., Auburn, Ala. 36830

[21] Appl. No.: 370,803

[22] Filed: Jan. 10, 1995

[51] Int. Cl.$^6$ .............................. A62D 3/00; B09B 3/00; C04B 7/28
[52] U.S. Cl. ..................... 588/257; 106/697; 106/706; 106/707; 106/DIG. 1; 405/128; 405/129; 588/256
[58] Field of Search ..................................... 588/252, 256, 588/257; 106/697, 706, 707, 708, DIG. 1; 405/129, 266, 128; 210/751

[56] References Cited

U.S. PATENT DOCUMENTS

| | | | |
|---|---|---|---|
| Re. 29,783 | 9/1978 | Smith et al. | 106/DIG. 1 X |
| 2,564,690 | 8/1951 | Havelin et al. | |
| 2,698,252 | 12/1954 | Havelin et al. | |
| 2,815,294 | 12/1957 | Havelin et al. | |
| 2,937,581 | 5/1960 | Havelin et al. | |
| 2,942,993 | 6/1960 | Handy | 106/706 |
| 3,634,115 | 1/1972 | Minnick | 106/DIG. 1 X |
| 3,785,840 | 1/1974 | Minnick et al. | 106/DIG. 1 X |
| 3,852,084 | 12/1974 | Webster et al. | 106/DIG. 1 X |
| 3,854,968 | 12/1974 | Minnick et al. | 106/DIG. 1 X |
| 3,870,535 | 3/1975 | Minnick et al. | 106/DIG. 1 X |
| 3,932,275 | 1/1976 | Mewes et al. | |
| 3,947,284 | 3/1976 | Kitsugi et al. | |
| 3,980,558 | 9/1976 | Thompson | |
| 4,018,619 | 4/1977 | Webster et al. | 106/DIG. 1 X |
| 4,028,130 | 6/1977 | Webster et al. | 106/DIG. 1 X |
| 4,121,945 | 10/1978 | Hurst et al. | 106/DIG. 1 X |
| 4,209,335 | 6/1980 | Katayama et al. | |
| 4,226,630 | 10/1980 | Styron | 106/DIG. 1 X |
| 4,250,134 | 2/1981 | Minnick | |
| 4,259,271 | 3/1981 | Minnick et al. | |
| 4,344,796 | 8/1982 | Minnick | 106/DIG. 1 X |
| 4,397,742 | 8/1983 | Minnick | 210/751 X |
| 4,397,801 | 8/1983 | Minnick | |
| 4,514,307 | 4/1985 | Chestnut et al. | 210/751 |
| 4,624,711 | 11/1986 | Styron | 106/DIG. 1 X |
| 4,741,782 | 5/1988 | Styron | 588/257 |

FOREIGN PATENT DOCUMENTS 1485625  9/1977  United Kingdom.

OTHER PUBLICATIONS

Schedule of "Precommercialization Activities Regarding Method of Stabilizing Industrial Wastes and Fly Ash Compositions Useful in Same." (undated).

Letter from William C. Webster to Leon Nigohosian, Jr., Esq., dated Mar. 22, 1995.

Bennett, R. G. and W. C. Webster, "Method of Reducing the Cost of Solidifying High Oil and Grease Sediments," presentation and paper given on Sep. 21, 1994 at the Emerging Technology in Hazardous Waste Management VI Conference in Atlanta, GA.

Metry, A. A. and A. J. Fazzini, "Stabilizing Hazardous Industrial Wastes," *Plant Engineering*, Sep. 4, 1980.

*Primary Examiner*—George A. Suchfield
*Attorney, Agent, or Firm*—Ratner & Prestia

[57] ABSTRACT

A method for stabilizing wet, oily petroleum refinery wastes and other similar wastes without the need for Portland cement. The waste is combined with at least 5 weight percent of a novel cementitious reagent composition comprised of Powder River Basin fly ash and circulating fluid bed combustion ash in weight ratios ranging from 1:9 to 9:1.

13 Claims, No Drawings

METHOD OF STABILIZING INDUSTRIAL WASTES AND FLY ASH COMPOSITIONS USEFUL IN SAME

FIELD OF THE INVENTION

The present invention relates to compositions useful in the stabilization of industrial wastes and a method of stabilization. In particular, oily sludges from petroleum refining, petrochemical manufacturing, and other industrial processes are incorporated in a cementitious mixture, comprised of selected other waste materials to yield a load-supporting, leach-resistant material suitable for disposal or reuse under environmental regulations.

BACKGROUND OF THE INVENTION

Society's increasing concern with the environmentally safe disposal of industrial wastes has led to the development of a variety of processes in which such wastes are used to form, or are incorporated in a cementitious material. Upon hardening, such material (when properly formulated) is suitable for disposal or for use as a construction or landfill material.

The adaptability of such processes for the disposal of a wide variety of waste materials, including organic waste materials, is suggested, for example, in British Patent No. 1,485,625 to Chappell and U.S. Pat. Nos. 3,947,284 to Kitsugi et al., 3,980,558 to Thompson, and 4,209,335 to Katayama et al. The teachings of these references are directed primarily to the utilization of Portland cement as the encapsulation material. Portland cement has been widely applied for the solidification or stabilization of wastes to meet RCRA (Resource conservation and Recovery Act) and CERCLA (Comprehensive Environmental Response, Compensation, and Liability Act) requirements.

Portland cement produces calcium silicate hydrates as its principal reaction product. This cement has been utilized in the prior art for its cementitious reactions either alone or in conjunction with other cementitious material. In particular, Portland cement has been utilized in the prior art in combination with fly ash to stabilize oily wastes. These combinations, however, which typically require on the order of 60% cement and 40% fly ash, must be used at a dosage rate of at least 25 weight percent based upon the wet weight of the oily waste to be stabilized. From an economic viewpoint, it is highly desirable to replace the cement in these prior art compositions with other less expensive reagents.

In addition to Portland cement, pozzolanic cement has also been utilized, eight by itself or in conjunction with filler material, such as aggregate, for various purposes wherein structural integrity, landfill or support is desired. Initially, the term, "pozzolanic" referred to a type of volcanic ash which by itself is not cementitious, but, when combined with lime or a lime generating material and water, hardens over time. Pozzolans generally are known to react slowly with alkaline earth oxides and moisture, ultimately setting up into a hard rock-like material.

Fly ash is a finely divided particulate material collected from combustion stack gases, typically from the combustion of pulverized coal in boilers. Fly ash may be considered an "artificial pozzolan," as distinguished from "natural pozzolans," which are generally of volcanic origin. Typically, a mixture of lime, fly ash and water produces calcium silicate hydrates and the reaction system can incorporate some organic compounds. These mixtures, although useful in stabilizing organic compounds, are not as effective as reagent mixtures containing Portland cement. Thus, the prior art more commonly uses Portland cement but may also suggest the use of byproduct materials such as fly ash or kiln dust (such as the waste by-product from lime or cement kilns), alone or in combination with Portland cement, to stabilize waste material including some organic wastes.

Examples of prior art references which teach the use of byproduct materials to produce solid bodies and/or to stabilize wastes include U.S. Pat. Nos. Re. 29,783 to Smith et al. (lime and fly ash to stabilize sulfate-containing waste such as acid mine drainage sludge), 4,226,630 to Styron (Powder River Basis fly ash to form solid, leach resistant bodies when combined with aqueous heavy metal sludges which can contain other inorganic ions); 4,397,801, 4,344, 796, and 4,250,134 to Minnick (Cementitious compositions comprising fluidized bed combustion ash and/or fly ash which harden when mixed with water).

When using prior art fly ash and/or kiln dust compositions without Portland cement, however, the reagent compositions must typically be used in large quantities (relative to the amount of waste being stabilized) in order to cementitiously react to form a hard body. Moreover, when using prior art combustion byproduct reagents such as fly and bed ashes to stabilize organic wastes these reagents alone are not very reactive and thus are not very effective (in the absence of Portland cement) in encapsulating low solids/high moisture content wastes.

SUMMARY OF THE INVENTION

The present invention comprises reagent combinations which are effective in stabilizing certain petroleum refinery wastes and other similar wastes (particularly oily sludges) without the need for Portland cement. These reagent combinations include a particular kind of fly ash (namely that generated using coal from the Powder River Basis and thus referred to as Powder River Basin or PRB ash) and the ash waste from a particular kind of fluidized bed coal combustor (namely a combustor using what is known as a Circulating Fluid Bed Combustion Unit). The combination of these ashes utilized in the present invention results in a chemical reaction which causes the mixture of reagent and waste to harden at low dosage rates, even in combination with oily wastes, thereby resulting in an economic advantage over the prior art Portland cement and fly ash reagents utilized alone or in combination. More specifically, PRB fly ash and circulating fluid bed combustion ash compositions of this invention are found to solidify or stabilize petroleum refinery wastes and other similar wastes, in particular oily sludges, while requiring lower reagent loading rates as compared to stabilization compositions of the prior art.

To stabilize oily waste of relatively low solids (high water) content (below 50% solids, for example), an even lower reagent dosage rate can be achieved by the method of the present invention by the addition of soil-like materials to the wastes to be stabilized, either prior to or simultaneously with the addition of the reagent compositions. Thus, by raising the solids content in wet wastes, the amount of fly ash/circulating fluid bed combustion ash required to stabilize the waste is further reduced.

Apart from stabilization of oily wastes, the present invention comprises a uniquely reactive combination of waste materials (namely PRB fly ash and CFB combustion ash) which should be useful, either alone or with other materials, both reactive and non-reactive, to form hardened, load bearing, relatively impermeable and relatively leach-resistant structures, including road bases, landfills and the like.

DETAILED DESCRIPTION OF THE INVENTION

The present invention may be better understood by reference to the following detailed description and claims.

As used herein, the term "petroleum refinery waste" refers to by-product wastes generated in typical oil refining and petrochemical manufacturing processes, which is often lagooned or landfilled. Such wastes comprise a wide variety of oily and greasy materials with solid contents ranging from 15 to 80%, oil and grease contents of from 5 to 20%, and water making up the remainder of the waste.

The term "fly ash" as used in the present specification is intended, except as noted below, to indicate the finely divided ash combustion residue of coal which meets ASTM standard C 618–93, Class C. The coal used is typically pulverized and burned, for instance, in power plants. The fly ash is carried off with the gases exhausted from boilers or furnaces in which such coal is burned and is typically recovered by means of suitable precipitation apparatus such as electrostatic precipitators. Typically these ashes are in a finely divided state such that usually at least seventy percent dry weight passes through a two hundred-mesh sieve.

In particular, the present invention utilizes a particular variety of Class C fly ashes which is a byproduct of pulverized coal from the Powder River Basin. Powder River Basis (PRB) coal deposits occur in a well-defined region of northern Wyoming and southern Montana and are used in power generation. The coal which is mined from these deposits is sub-bituminous, i.e., coal of rank intermediate between bituminous and lignite having caloric values in the range of 8,300 to 13,000 BTU per pound (calculated on a moist, mineral- and matter-free basis). When combusted in power generating plants, PRB coals yield ashes which comprise free calcium oxide and amorphous silicates that are cementitious in nature to, those from the Fayette Power Plant located in Texas, as supplied by Monex Resources, Inc., Atlanta, Ga., and the Big Cajun Electric Power Plant 2 located in New Roads, La., as supplied by Bayou Ash, Inc., Baton Rouge, La., or from the Parish Power Plant located in Texas and as supplied by JTM Industries, Inc., Strafford, Tex.

As used in this invention, the term "circulating fluid bed ash" (hereinafter CFB ash) refers to the solid residue collected from a pulverized fuel boiler wherein a mixture of pulverized fuel, such as coal or coke, and pulverized limestone particles are floated on an air or gas stream and are fluidized proximate to the point of ignition of the fuel. The heat from the combustion of the fuel calcines the limestone particles, thus allowing the subsequent reaction of calcium oxide from the limestone with the $SO_x$ gases released from the combustion of the fuel. The solid residue which results is carried primarily in the exhaust gases. A portion of this residue is removed as fly ash by a cyclone or other separation device with the remainder being returned to the fluidizing gas stream. The solid residue can also be removed in a coarser form from the bottom of the boiler as bed ash.

The CFB ash useful in the practice of the present invention can be incorporated in either the fly ash or the bed ash form. These CFB fly and bed ashes typically consist of calcium oxide, calcium sulfate, calcium carbonate, and coal ash. Preferred CFB ashes are from a low ash fuel source, such as ash from a petroleum coke fuel source, an example of which is the CFB ash from the Nelson Industrial Steam Company (NISCO) generating station and supplied by Dravo, Co., Kenner, La. Other CFB ashes useful in this invention include that generated at the AES Shady Point generating station and supplied by the Falco, Co., Vicksburg, Miss.; or that generated at the TexMex generating station in Calvert, Tex. and supplied by the JTM Industries, Inc., Strafford, Tex.

The CFB fly and bed ashes used in the present invention are to be distinguished from prior art Fluidized Bed Combustion (FBC) ashes, which have been used as cementitious reagents in a number of ways. First, CFB ashes are residues which result from the use of pulverized fuel and limestone sources whereas FBC ashes typically result from much coarser starting materials. As a result the CFB materials are powder-like and have much finer average particle sizes (e.g. 0.05 mm average particle size). In direct contrast the prior art FBC ashes are much coarser and resemble a uniformly graded sand (e.g., 1.7 mm average particle sizes). It is believed that the finer particle sizes of the CFB ashes make them more reactive as a cementitious reagent than the prior art FBC materials.

Second, FBC residues typically have a calcium sulfate shell formation which encapsulates unreacted lime and limestone. Thus prior art uses of FBC materials required that they be mulled to liberate these unreacted forms of calcium oxide. This is in direct contrast to the powder-like CFB ashes of the present invention which are thoroughly reacted in the fluidized fuel boilers. The absence of a calcium sulfate shell formation also results in a third difference between the CFB ashes and prior art FBC ashes—the CFB ashes have a lower $CaO:SO_3$ ratio (i.e., a higher sulfur content). Typically, CFB ashes have a $CaO:SO_3$ ratio ranging from about 1.7 to about 2.6 while prior art FBC ashes range from about 2.5 to about 5.2. It is believed that this higher sulfur content is due to calcium oxide of the limestone particles in the CFB ashes being readily available for reaction with $SO_x$ gases released during the combustion of the fuel source. Moreover, unlike FBC materials, the sulfur content of the CFB ashes is further increased by continued recirculation into the fluidizing gas stream prior to being removed by a bleed stream. It is believed that the high sulfur contents of these CFB ashes react to form ettringite, a hard stable mineral phase, when used in conjunction with PRB Class C fly ashes to stabilize oily wastes according to the present invention.

A fourth difference is that the CFB ashes are calcined at lower temperatures and for shorter times than the FBC ashes of the prior art which are fairly hardburned materials. It is believed that the CFB materials which result hydrate more readily than FBC materials and thus further contribute to the cementitious reaction. Thus, the CFB materials of the present invention, because they have finer particle sizes, higher sulfur concentrations, and are calcined at lower temperatures/shorter times, are much more reactive than FBC ashes generally and therefore are highly effective in the stabilization of high moisture, low solids, and high oil content sludges.

In accordance with the present invention, PRB fly ash/CFB ash mixtures effectively stabilize (i.e., physically solidify) a wet, oily waste material to a particular hardness level and/or also chemically stabilize the oily waste material to enhance the leach-resistance of the material to acceptable environmental levels. Typically, PRB Class C fly ash and CFB ash (optionally pre-blended and mixed) are intermixed with the oily waste in a proportion of at least about 5 percent of the wet weight of the waste (the minimum being determined primarily by the water content of the sludge as disclosed below). Water, typically included in the wet waste to be stabilized, must be present in an amount at least sufficient to provide a compactible mixture such that the reactants may effectively stabilize the sludge. Additional water, however, may be incorporated in the mixtures to provide paste-like and pourable compositions. The proportion of PRB fly ash to CFB ash is in the range of 1:9 to 9:1 on a dry weight basis, preferably 1:3 to 6:1 and most preferably from 1:2 to 5:1.

The minimum dosage rate for the PRB fly ash/CFB ash reagent combination varies (upward from the overall mixture of 5% as stated above) as waste solids content decreases and as the PRB fly ash to CFB ash ratio in the reagent mixture varies. Thus, with a waste solids content of 25% (which is relatively low), the minimum reagent dosage, even at optimum fly ash to CFB ash ratio, will be on the order of 20% (See Example 1 below). The minimum reagent dosage rate for low solids content waste may, however, be reduced by the addition of soil to the mixture (See Example 4 below) at least up to a total solids content in the final overall mixture of up to 65%, preferably 50–60%, based upon the total weight of the soil and the waste material. Upon adding soil in these amounts to relatively low solids content waste, the fly ash/CFB ash minimum dosage rates are typically lowered to at least 10 weight percent of the wet weight of the organic waste material to be stabilized.

When added to an oily sludge in these amounts, the stabilizer materials of the present invention result in a material which has an unconfined compressive strength of greater than 10 psi (as measured by ASTM Method D2166), low water permeability (typically, $<1\times10^{-5}$ cm/second as measured by ASTM Method D5084) and passes EPA leaching requirements (typically, TCLP). Higher compressive strengths may be obtained, if desired, by the use of higher doses of the stabilization reagents. These higher strength materials may be suitable for construction uses, such as roads, foundations, fill, etc. The reagent mixture may also be useful in making other products, particularly in stabilizing other types of wastes and in construction applications excluding the waste.

It should be noted, however, that some combination of PRB fly ash and CFB ash is beneficial in all cases. In general, neither of these reagents, either alone or in combination with other fly ashes or fluidized bed ashes, are effective, at economically attractive dosage rates and dosage rates in the absence of Portland cement, to stabilize the oily wastes to which this invention is primarily addressed. As seen in Example 3 below, some CFB ash may possess a degree of reactivity which may render it useful, by itself, for some purposes. However, that ash is produced in a CFB combustion unit in which some or all of the fuel source is lignite. Therefore, while the ash includes a desirable ratio of reactive silica and calcium, it also includes a relatively high proportion of non-reactive diluent material. As a result, even with this CFB ash, combination with some PRB fly ash is necessary to achieve the most effective stabilization performance.

Given the great variability of waste materials to be treated, as well as PRB fly ash and CFB ash reactant materials, it will be appreciated that application of this invention to any given set of conditions will require some experimentation. Such experimentation, however, is within the purview of those skilled in the art who will be readily guided by the disclosure above and the examples as set forth below.

In general, the most economically attractive mixes of the present invention (i.e., those requiring the lowest reagent dosage rates) are those with lower ash content CFB ashes and a higher ratio of PRB fly ash to CFB ash. For minimum dosage rates, the optimum fly ash to CFB ash ratio increases as the ash content of the CFB ash decreases.

The following are several examples in which the present invention has been used to produce solidified load-bearing products from industrial oily wastes having high moisture and low solids contents.

EXAMPLE 1

Bayou Fly Ash and Dravo CFB Ash

In this example of the present invention, the following materials were used: Class C Bayou fly ash from the Big Cajun Electric Power Plant (Powder River Basin Coal); Dravo circulating fluid-bed combustion ash from the Nelson Industrial Steam Company (NISCO) burning petroleum coke and using high calcium limestone; and Sediment Sample E7500/E7700 from waste ponds of an operating oil refinery in Beaumont, Tex.

The Power River Basin Coal used at the Big Cajun Electric Power Plant contains about 0.4% sulfur, and has an ash content of 5.2%. The powdered coal combustion burners have a flame temperature of 2800° F. to 3000° F., resulting in exposure of the ash to temperatures well above 2000° F., followed by rapid cooling. The resulting Class C fly ash has the typical analysis shown below.

The petroleum coke used as the fuel source at NISCO to produce CFB ash has 5.4 to 6.0% sulfur and about 0.3% ash. A powdered coke/limestone mixture is mixed with a recycle stream and fed into the boiler through multiple jets at the bottom of the bed at a combustion temperature of typically about 1650° F. The resulting CFB ash has the typical analysis shown below.

| Parameter | Typical Chemical Analysis (% by weight) | |
| --- | --- | --- |
| | Big Cajun Fly Ash | NISCO CFB Ash |
| Silicon Dioxide, $SiO_2$ | 33.7% | 1.4% |
| Aluminum Oxide, $Al_2O_3$ | 20.5% | 0.2% |
| Iron Oxide, $Fe_2O_3$ | 6.5% | 0.2% |
| Calcium Oxide, CaO | 28.8% | 50.7% |
| Magnesium Oxide, MgO | 6.0% | 1.7% |
| Sulfur Trioxide, $SO_3$ | 2.9% | 42.4% |
| Loss on Ignition, 600° C. | — | 1.4% |
| Loss on Ignition, 1000° C. | 0.3% | 3.7% |
| Available Alkalies, as $Na_2O$ | 0.8% | — |

Mixtures of various ratios of the Class C fly ash and CFB ash were added to an oily waste from refinery operations by hand mixing the ingredients in a small cup.

The sediment to be stabilized had 29.6% solids, a density of 68.6 pounds per cubic foot (pcf), was black and very oily in appearance with a greasy or slippery handling characteristic and a noticeable hydrocarbon odor. The oil and grease content was approximately 8% (as measured by EPA Test Method 9071).

After the mixtures of reagent and sediment had cured in sealed containers, a pocket penetrometer was used to determine the degree of hardening, noting the tons per sq. ft. of surface area required to penetrate ¼ inch.

A range of reagent dosage rates was used at each selected ratio of Class C/CFB ash, to determine the amount of reagents required to reach a penetration resistance of at least 1.0 which is considered to be the minimum acceptable hardness level. Results were as follows:

Penetration Resistance of Reagent: Sediment Mixtures
(in tons per sq. ft. of surface area)
7-DAY CURE

| | Ratio of Class C:CFB | | | | | | |
|---|---|---|---|---|---|---|---|
| Reagent Dosage[1]: | 100:0 | 80:20 | 70:30 | 60:40 | 40:60 | 20:80 | 0:100 |
| 20% | — | — | — | 1.4 | — | — | — |
| 25% | — | — | 1.8 | 3.0 | — | — | — |
| 30% | 0.0 | 1.8 | 3.6 | 4.0 | 0.7 | 0.1 | 0.0 |
| 35% | 0.0 | 2.7 | — | >4.5 | 1.3 | 0.3 | 0.0 |
| 40% | 0.1 | 3.7 | — | >4.5 | 1.5 | 0.3 | 0.0 |
| 45% | 0.2 | 4.5 | — | >4.5 | 1.8 | 0.5 | 0.0 |

[1]% by wet wt of sediment prior to adding reactant
NOTE: 50:50 ratio at 30% dosage rate had 1.3 penetration resistance.

EXAMPLE 2

Bayou Fly Ash: Falco CFB Ash

In this example, the following materials were used: Class C Bayou fly ash from the Big Cajun Electric Power Plant using a Powder River Basis Coal fuel source; and Falco CFB ash from AES Shady Point generating plant which used various coal sources and a high calcium limestone. The Powder River Basis Coal used at the Big Cajun Electric Power Plant was from the same sample as used in Example 1.

The coal burned at Shady Point is understood to emanate from several different deposits. The resulting ash has the typical analysis shown below. The powdered coal/limestone mixture is mixed with a recycle stream and fed into the boiler through multiple jets at the bottom of the bed. The combustion temperature is thought to be about 1650° F.

Typical Chemical Analysis
(% by weight)

| Parameter | Big Cajun Fly Ash | Shady Point CFB Ash |
|---|---|---|
| Silicon Dioxide, $SiO_2$ | 33.7% | 17.7–20.9% |
| Aluminum Oxide, $Al_2O_3$ | 20.5% | 8.7–2.9% |
| Iron Oxide, $Fe_2O_3$ | 6.5% | 10.0–13.0% |
| Calcium Oxide, CaO | 28.8% | 37.8–39.2% |
| Magnesium Oxide, MgO | 6.0% | 1.7–2.1% |
| Sulfur Trioxide, $SO_3$ | 2.9% | 14.8–18.9% |
| Loss on Ignition, 600° C. | — | — |
| Loss on Ignition 1000° C. | 0.3% | — |
| Available Alkalies, as $Na_2O$ | 0.8% | 0.3–0.5% |

The sediment used in this example was also from a refinery operations waste pond at an oil refinery. It had 26.5% solids, a density of 64.9 pcf, and was black and very oily in appearance, not pourable, and had a greasy or slippery handling characteristic with a noticeable hydrocarbon odor. The oil and grease content was approximately 12%.

Mixtures of various ratios of Class C fly ash and CFB ash were added to this oily waste by hand mixing the ingredients in a small cup.

After the mixture of reagent and sediment had cured in sealed containers, a pocket penetrometer was used to determine the degree of hardening, noting the tons per sq. ft. of surface area required to penetrate ¼ inch. A range of reagent dosage rates was used at each selected ratio of Class C: CFB ash, to determine the amount of reagents required to reach a penetration resistance of at least 1.0 which is considered to be the minimum acceptable hardness level. Results were as follows:

Penetration Resistance of Reagent: Sediment Mixtures
(in tons per sq. ft. of surface area)
7-DAY CURE

| | Ratio of Class C:CFB | | | | | |
|---|---|---|---|---|---|---|
| Reagent Dosage[1]: | 100:0 | 80:20 | 60:40 | 40:60 | 20:80 | 0:100 |
| 30% | — | — | — | 1.3 | 0.2 | — |
| 35% | 0.0 | 0.5 | 1.1 | 1.7 | 0.3 | — |
| 40% | 0.0 | 0.8 | 2.3 | 1.8 | 0.4 | — |
| 45% | 0.0 | 1.2 | 4.0 | 3.7 | 0.8 | — |
| 50% | 0.1 | 1.6 | >4.5 | — | — | — |

[1]% by wet wt of sediment prior to adding reactant

In comparing Examples 1 and 2, it should be noted that the Shady Point CFB ash has a higher $SiO_2$, $Al_2O_3$, and $Fe_2O_3$ content and a lower CaO and $SO_3$ content than the NISCO CFB ash. These differences result from the use of coal sources having higher ash content than the NISCO petroleum coke and cause a shift in the optimum ratios of Class C to CFB ash toward the CFB-rich side of the table (to yield about the same $CaO:SiO_2:SO_4$ ratios as in Example 1). It is believed that the penetration results obtained in Example 2, which are not as favorable as in Example 1, may be affected by two factors. First, the power plant which produces the CFB ash may have been burning some non-Powder River Basin coal, which would reduce the reactivity of the resulting coal ash component of the CFB ash. Secondly, the combustion temperature in the CFB combustion boiler, being much lower than those used in conventional fly ash boilers, results in a less reactive coal ash component of the CFB ash.

EXAMPLE 3

Bayou Fly Ash and TexMex CFB Ash

Mixtures of various ratios of Class C fly ash and circulating fluid bed combustion fly ash were added to an oily waste from refinery operations, by hand mixing the ingredients in a small cup.

In these tests, the following materials were used: Class C fly ash from big Cajun Electric Power Plant (Powder River Basin Coal); CFB ash—Texas New Mexico Public Service (Texas lignite fuel source and high calcium limestone); and Sediment Sample E8700/E8900 from a refinery operations waste pond.

The sediment had 26.5% solids, a density of 64.9 pcf, and was black and very oily in appearance. It was not pourable, was greasy (with a slippery handling characteristic), and had a noticeable hydrocarbon odor. The oil and grease content was approximately 12%.

The Powder River Basin Coal used at Big Cajun was the same as used in Example 1.

The fuel source used at TexMex is from a nearby Texas lignite deposit, and typically contains about 15% ash and 1.5% sulfur. The resulting ash has the typical analysis shown below. The powdered coal/limestone mixture is mixed with a recycle stream and fed into the boiler through multiple jets at the bottom of the bed. The combustion temperature is thought to be similar to that used at the NISCO generating plant (i.e., about 1650° F.).

| Typical Chemical Analysis (% by weight) | | |
| --- | --- | --- |
| Parameter | Big Cajun Fly Ash | TexMex CFB Ash |
| Silicon Dioxide, $SiO_2$ | 33.7% | 46.2% |
| Aluminum Oxide, $Al_2O_3$ | 20.5% | 15.5% |
| Iron Oxide, $Fe_2O_3$ | 6.5% | 4.1% |
| Calcium Oxide, CaO | 28.8% | 20.0% |
| Magnesium Oxide, MgO | 6.0% | 3.3% |
| Sulfur Trioxide, $SO_3$ | 2.9% | 7.8% |
| Loss on Ignition, 600° C. | — | — |
| Loss on Ignition 1000° C. | 0.3% | 2.8% |
| Available Alkalies, as $Na_2O$ | 0.8% | 0.3% |

After the mixtures of reagent and sediment had cured in sealed containers, a pocket penetrometer was used to determine the degree of hardening, noting the tons per sq. ft. of surface area requiring to penetrate ¼ inch.

A range of reagent dosage rates was used at each selected ratio of Class C: CFB ash, to determine the amount of reagents required to reach a penetration resistance of at least 1.0 which is considered to be the minimum acceptable hardness level. Results were as follows:

| Penetration Resistance of Reagent: Sediment Mixtures (in tons per sq. ft. of surface area) 7-DAY CURE | | | | | | |
| --- | --- | --- | --- | --- | --- | --- |
| | Ratio of Class C:CFB | | | | | |
| Reagent Dosage[1]: | 100:0 | 80:20 | 60:40 | 40:60 | 20:80 | 0:100 |
| 30% | — | — | — | 0.3 | 0.5 | 0.3 |
| 35% | 0.0 | 0.2 | 0.2 | 0.7 | 0.8 | 0.8 |
| 40% | 0.1 | 0.3 | 0.8 | 1.3 | 2.3 | 1.8 |
| 45% | 0.1 | 0.4 | 1.3 | 1.8 | 3.7 | 3.2 |
| 50% | 0.3 | 0.7 | 1.6 | — | — | — |

[1]% by wet weight of sediment.

In comparing Example 3 with Example 2, it should be noted that the TexMex CFB ash has still higher $SiO_2$, $Al_2O_3$, and $Fe_2O_3$ as compared to the Shady Point CFB ash, and lower CaO content. These differences result from the use of coal sources with higher ash content than the Shady Point coals. Observe that the optimum ratios of Class C to CFB ash are moved further toward the CFB side of the table and the penetration results are not as favorable as in Example 1 (believed to be caused by the use of non-PRB coal which acts as a diluent to the mixture. Also, as in the case in Example 2, the lower combustion temperature, as compared to conventional boilers, also results in a less reactive coal ash component of the CFB ash.

EXAMPLE 4

Soil Additions and Fly/CFB Ash

To show the effect of increasing the solids content of an oily waste to be stabilized, mixtures of Class C fly ash, circulating fluid bed combustion fly ash (in a standardized—for this experiment—60:40 ratio), and soil were added to an oily waste from refinery operations, by hand mixing the ingredients in a small cup. The following materials were used: Class C fly ash-Big Cajun Electric Power Plant (Powder River Basin Coal); CFB ash-Nelson Industrial Steam Company, or NISCO (petroleum coke and high calcium limestone); and soil—site soil consisting of clay and silt particles; and Sediment Sample E7100/E7300.

The sediment had 28.0% solids, a density of 67.7 pcf, and was black and very oily in appearance, thick and viscous with a greasy or slippery handling characteristic, and with a noticeable hydrocarbon odor. The oil and grease content was approximately 11%.

The Big Cajun fly ash and the NISCO CFB ash were the same as used in Example 1.

The soil was from on-site stockpiles that had been accumulated from various construction projects. It had approximately 7% moisture by wet weight of soil.

After the mixtures of reagent, soil and sediment had cured in sealed containers, a pocket penetrometer was used to determine the degree of hardening, noting the tons per sq. ft or surface area required to penetrate ¼ inch, after a 3-day cure cycle and also after a 7-day cure cycle.

A range of sludge to soil ratios was tested, and the reagent dosage rates were varied at each selection ratio of sludge:soil, to determine the amount of reagents required to reach a penetration resistance of either 1.0 (considered the minimum acceptable) or 3.0 (the project-specific goal). Results were as follows:

| Penetration Resistance of Reagent: Sediment:Soil Mixtures (in tons per sq. ft. of surface area) 3-DAY CURE | | | | | |
| --- | --- | --- | --- | --- | --- |
| | Ratio of Sludge:Soil | | | | |
| Reagent Dosage[1]: | 1:0 | 1:0.5 | 1:0.75 | 1:1 | 1:1.25 |
| 10% | — | — | — | 0.4 | 0.3 |
| 15% | — | — | 2.2 | 1.3 | 1.2 |
| 20% | 0.3* | 0.8 | 3.0 | 1.9 | — |
| 25% | 0.8* | 1.3 | 4.0 | — | — |
| 30% | 1.0* | 2.0 | — | — | — |
| 35% | 2.0* | — | — | — | — |

| Penetration Resistance of Reagent: Sediment Mixtures (in tons per sq. ft. of surface area) 7 DAY CURE | | | | | |
| --- | --- | --- | --- | --- | --- |
| | Ratio of Class C:CFB | | | | |
| | 1:0 | 1:0.5 | 1:0.75 | 1:1 | 1:1.25 |
| Reagent Dosage[1]: | | | | | |
| 10% | — | — | — | 0.4 | 0.4 |
| 15% | — | — | 3.1 | 1.5 | 1.6 |
| 20% | 1.4* | 2.6 | 4.2 | 2.5 | — |
| 25% | 3.0* | 3.4 | >4.5 | — | — |
| 30% | 4.0* | >4.5 | — | — | — |
| 35% | >4.5* | — | — | — | — |
| Solids Content of Sludge:Soil Mixture[2] | 30%* | 50% | 56% | 61% | 65% |

[1]% by wet weight of sediment
[2]calculated from solids contents of sludge and soil
*reference point from Example 1, on similar sludge

EXAMPLE 5

High Solids Sludge and Fly/CFB Ash

The following data shows the reagent dosages needed to stabilize a high solids sludge. In this example of the present invention, the following materials were used: Class C Bayou fly ash from the Big Cajun Electric Power Plant (Powder River Basin Coal); Dravo CFB ash from the Nelson Industrial Steam Company (NISCO) burning petroleum coke and using high calcium limestone; and Sediment Sample E2-3/

E7300L from waste ponds of an operating oil refinery in Beaumont, Tex.

The Big Cajun fly ash and the NISCO CFB ash were the same as used in Example 1. Mixtures of the Class C fly ash and CFB ash in a ratio of 60:40 were added to the oily waste from refinery operations by hand mixing the ingredients in a small cup.

The sludge to be stabilized had 71% solids, a density of 84 pounds per cubic foot (pcf), was black and very oil in appearance, thick and viscous (putty-like) with a greasy or slippery handling characteristic, and a noticeable hydrocarbon odor. The oil and grease content was approximately 16% (as measured by EPA Test Method 9071). The solids content of the sludge was adjusted, up or down, by air drying or by adding water.

After the mixtures of reagent and sediment had cured in sealed containers, a pocket penetrometer was used to determine the degree of hardening, noting the tons per sq. ft. of surface area required to penetrate ¼ inch.

A range of reagent dosage rates was used at each selected ratio of Class C/CFB ash, to determine the amount of reagents required to reach a penetration resistance of at least 1.0 which is considered to be the minimum acceptable hardness level. Results were as follows:

Penetration Resistance of Reagent: Sediment Mixtures
(in tons per sq. ft. of surface area)
3-DAY CURE

| Reagent Dosage[1]: | Sludge Solids Content | | |
|---|---|---|---|
| | 65% | 71% | 76% |
| 5% | 0.5 | 0.8 | 1.2 |
| 7.5% | 0.8 | 1.3 | 1.2 |
| 10% | 1.1 | 1.9 | 2.8 |
| 12.5% | 1.5 | 1.8 | 3.0 |
| 15% | 2.0 | 2.2 | —* |

[1]% by wet wt of sediment prior to adding reactant
*mixture too thick to mix by hand (not practical)

Penetration Resistance of Reagent: Sediment Mixtures
(in tons per sq. ft. of surface area)
7-DAY CURE

| Reagent Dosage[1]: | Sludge Solids Content | | |
|---|---|---|---|
| | 65% | 71% | 76% |
| 5% | 0.6 | 1.0 | 1.8 |
| 7.5% | 1.1 | 1.5 | 2.7 |
| 10% | 1.3 | 2.5 | 3.3 |
| 12.5% | 2.3 | 2.6 | 3.8 |
| 15% | 2.9 | 3.7 | —* |

[1]% by wet wt of sediment prior to adding reactant
*mixture too thick to mix by hand (not practical)

It is contemplated that the cementitious mixtures of the present invention may also be used to stabilize other waste materials (such as industrial or municipal sludges) or to form expansive or non-contracting cements or pre-stressed structural members. Further, it may be admixed with soil, aggregate or other filler material and may be applied to a surface, in admixture with such materials or be admixed thereon, to stabilize soils or to form a subsurface base for highways, runways, etc. Depending on the application, the mixture, if at a solids content sufficiently high so that the solids present are compactible, may be compacted prior the hardening.

While this invention has been described with reference to specific embodiments, it is not necessarily limited thereto. Accordingly, the appended claims should be construed to encompass not only those forms and embodiments of the invention specifically described above, but to such other forms and embodiments as may be devised by those skilled in the art without departing from its true spirit and scope.

What is claimed:

1. A method for converting an oily waste material to a material suitable for disposal or reuse as a construction material, said method comprising intermixing a combination of Class C Powder River Basin fly ash, circulating fluid bed combustion (CFB) ash, and a petroleum refinery waste material, cementitiously reacting said combination for a time sufficient to permit a stabilization reaction to occur such that the resultant product has a penetration resistance of at least 1 tsf, wherein said fly ash and said CFB ash are present in said combination in a dry weight ratio of from 1:9 to 9:1, and in a total amount comprising at least 5.0 weight percent of the wet weight of said waste material, and said combination has a water content such that it has a consistency ranging from pourable to compactible.

2. The method as recited in claim 1 wherein said fly ash:CFB ash ratio range is from 1:3 to 6:1.

3. The method as recited in claim 1 wherein said fly ash:CFB ash ratio range is from 1:2 to 5:1.

4. The method as recited in claim 1 wherein said combination comprises said fly ash and said CFB ash together in an amount which is at least 20 weight percent of the wet weight of said waste material.

5. The method as recited in claim 1 further comprising prior to said cementitiously reacting, intermixing soil with said combination in an amount which yields a total solids content up to 65 weight percent based upon the total weight of said soil and said waste material.

6. The method as recited in claim 5 wherein said total solids content is in the range of 50 to 60 weight percent based upon the total weight of said soil and said waste material.

7. The method as recited in claim 5 wherein said soil is added to said waste material prior to combination with said fly ash and said CFB ash.

8. The methods as recited in claim 5 wherein said combination comprises said fly ash and said CFB ash together in an amount which is at least 10 weight percent of the wet weight of said organic waste material.

9. The method as recited in claim 1 wherein said fly ash and said CFB ash are pre-blended and then combined with said waste.

10. A cementitious composition comprising a combination of fly ash which is a combustion byproduct of pulverized Powder River Basin coal and circulating fluid bed combustion (CFB) ash, wherein said fly ash:CFB ash ratio is from 1:3 to 6:1.

11. A cementitious composition comprising a combination of fly ash which is a combustion byproduct of pulverized Powder River Basin coal and circulating fluid bed combustion (CFB) ash, wherein said fly ash:CFB ash ratio is from 1:2 to 5:1.

12. A substantially impermeable, leach-resistant and load-bearing body produced by the method as recited in claim 1.

13. A substantially impermeable, leach-resistant and load-bearing body produced by the process as recited in claim 5.

* * * * *